United States Patent [19]

Malachosky et al.

[11] Patent Number: 4,942,929

[45] Date of Patent: Jul. 24, 1990

[54] DISPOSAL AND RECLAMATION OF DRILLING WASTES

[75] Inventors: Edward Malachosky, Coppell, Tex.; Donna M. Lantero, Anchorage, Ak.

[73] Assignee: Atlantic Richfield Company, Los Angeles, Calif.

[21] Appl. No.: 322,585

[22] Filed: Mar. 13, 1989

[51] Int. Cl.⁵ .............................................. E21B 21/06
[52] U.S. Cl. ..................................... 175/66; 175/206; 175/207; 405/128
[58] Field of Search ................... 175/66, 88, 206, 207, 175/217; 166/266, 268; 210/806; 405/53, 128, 263, 258

[56] References Cited

U.S. PATENT DOCUMENTS

| | | | |
|---|---|---|---|
| 2,919,898 | 1/1960 | Marwil et al. | 175/66 |
| 4,241,787 | 12/1980 | Price | 405/128 |
| 4,378,056 | 3/1983 | Gay, Jr. | 175/66 |
| 4,400,314 | 8/1983 | Ellis et al. | 405/128 |
| 4,429,746 | 2/1984 | Allard | 405/128 |
| 4,546,783 | 10/1985 | Lott | 175/66 |
| 4,632,601 | 12/1986 | Kuwada | 405/128 |
| 4,793,423 | 12/1988 | Knol | 175/88 |
| 4,809,791 | 3/1989 | Hayatdavoudi | 175/207 |

Primary Examiner—Stephen J. Novosad
Assistant Examiner—Terry Lee Melius
Attorney, Agent, or Firm—Michael E. Martin

[57] ABSTRACT

Drilling cuttings comprising usable gravel, silts, clays and spent drilling fluid are reclaimed and disposed of during or after the process of drilling a well by separating construction-grade gravel from the drilling fluid and washing the gravel, if necessary, prior to storage or placing it in use as construction material. Solids not reclaimed for construction use are formed as a slurry and conducted to an injection well by and through centrifugal pumps or mechanical agitators for dispersing the fine solids in the slurry to aid in the injection process. Gravel wash water may be used as a component of the waste slurry and the slurry may be conditioned for injection by the addition of surfactants and dispersants.

12 Claims, 1 Drawing Sheet

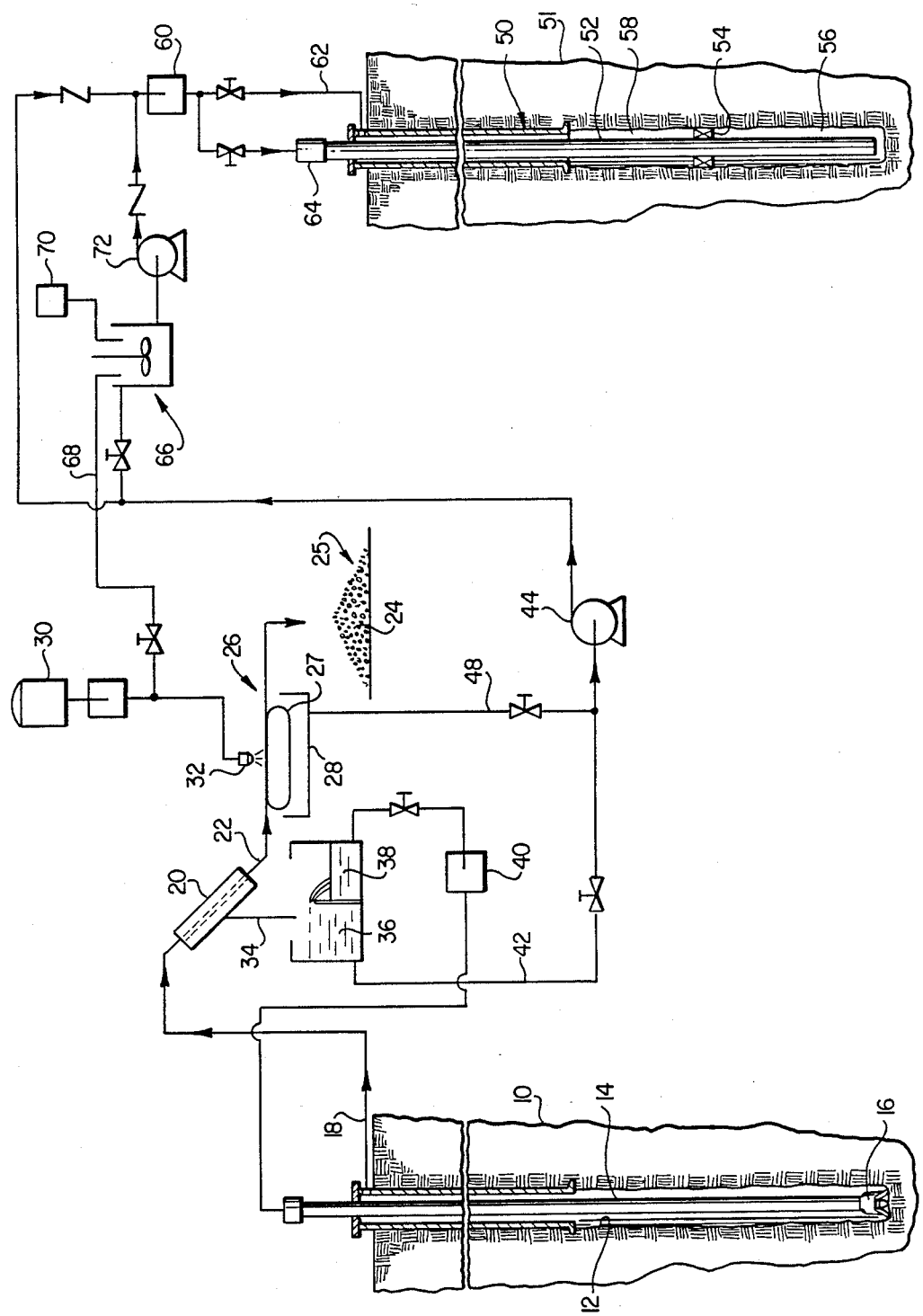

DISPOSAL AND RECLAMATION OF DRILLING WASTES

BACKGROUND OF THE INVENTION

1. Field of the Invention

The present invention pertains to a method and system for disposing of drilling fluids and fine drill cuttings generated during the drilling process and reclaiming usable materials such as various grades of gravel formed as part of the drill cuttings.

2. Background

In many oil and gas well development operations, the handling and disposal of the drilling fluid and the material entrained in the fluid during the drilling process, commonly known as the drill cuttings, has become an increasingly difficult problem. Environmental regulations and considerations prohibit or make undesirable the surface disposal of so-called drilling muds and drill cuttings. On the other hand certain categories of material produced in the drilling process may be reclaimable as useful construction materials such as various grades of sand or gravel. The so-called North Slope region of Alaska is one area where extensive oil and gas well drilling has occurred and may continue to occur and which produces useful construction-grade gravel as part of the drilling process. This material may be used to backfill reserve pits and to construct and maintain roads and well drilling and operating pads on the fragile earth's surface in this region. Moreover, although the disposal of drilling fluids and materials such as clay or fine earth particles on the surface may be unwanted from an environmental impact perspective, the disposal of these materials into subterranean formations may be acceptable and possibly beneficial.

To this end the present invention has been developed with a view to providing a unique system and method for disposing of and reclaiming certain components of drilling fluids and materials generated during the process of drilling oil and gas wells and the like.

SUMMARY OF THE INVENTION

The present invention is directed to minimizing drilling wastes and provides a method for disposing of certain waste materials generated during the process of drilling oil or gas wells and reclaiming certain portions of these materials. In accordance with an important aspect of the present invention, a process is provided for reclaiming useful grades of gravel for use as a construction material in connection with the construction and maintenance of roads and other surfaces and structures, for example. In accordance with another important aspect of the present invention there is provided a process for disposing of certain drilling fluids and materials generated during the formation of a drillhole which are otherwise considered not useful by treating these materials to provide a pumpable slurry which may be injected into a subterranean formation through existing or specifically-formed wellbores.

In accordance with another aspect of the present invention, a system is provided for treating the drilling fluid which is returned from a wellbore and which has entrained therein the drill cuttings to reclaim certain grades of such cuttings to produce a construction-grade gravel. The present invention further provides a system for treating drilling fluids and other drill cuttings material which are otherwise not useful or are considered waste material for reinjection into a subterranean formation. Other aspects of the present invention together with certain advantages and superior features thereof will be further appreciated by those skilled in the art upon reading the detailed description which follows.

BRIEF DESCRIPTION OF THE DRAWING

The drawing FIGURE comprises a schematic diagram of a system in accordance with the present invention for treating, reclaiming and disposing of drilling wastes.

DESCRIPTION OF A PREFERRED EMBODIMENT

In the description which follows and in the drawing, certain features and elements which are commercially available or are of conventional construction are described only in general terms and are shown in schematic form in the interest of clarity and conciseness.

Referring to the drawing FIGURE, there is illustrated a portion of an earth formation 10 into which a wellbore 12 is being drilled by a conventional rotary drill stem 14. As is customary in many well drilling procedures, a relatively dense liquid composition known as a drilling fluid or "mud" is pumped down through the drill stem 14 for cooling and lubricating a rotary bit 16 and for providing a medium of lifting the earth material or so-called drilling cuttings out of the wellbore. This drilling fluid may comprise water, certain clay-like materials to increase its density and viscosity and other conditioning agents or additives.

In certain areas in which substantial oil and gas well drilling activity is carried out, the formation characteristics are such, particularly near the Earth's surface, as to provide usable construction-grade gravel (material generally coarser than about 100 mesh) as part of the so-called drill cuttings or material which is removed to form the wellbore. One area where, in particular, such grades of gravel are useful is in the construction and development of the Alaskan North Slope oil fields, including the field known as Prudhoe Bay. In this area virtually all of the material excavated as drill cuttings from approximately the "top" 3500 ft. of wellbore can be recycled or reclaimed as construction material.

In accordance with the present invention, the drilling fluid or "mud" which includes the entrained drill cuttings is conducted from the wellbore annulus by way of a conduit 18 to a screening or so-called shale shaker device generally designated by the numeral 20. The screening device 20 may be of a suitable size to permit separation of the desired grade of gravel from the drilling fluid and finer grades of earth material entrained therein so that a separated and reclaimable grade of gravel 24 is conducted by way of suitable conveyor means 22 from the screening device for storage in a pile 25, for example. The screening device 20 may include other material separation means and be, for example, a model SB7 Mud Cleaner manufactured by the Caviem Corp. Depending upon the type of drilling fluid used and the composition of other materials in the drilling cuttings, the gravel 24 may require washing to remove mud particles and other compositions therefrom. In this regard the conveyor means 22 conducts the reclaimed gravel separated by the screening device 20 through gravel washing means generally designated by the numeral 26. The washing means 26 may include a suitable conveyor 27 and a water collection tank 28. The gravel to be washed is passed along the conveyor 27 wherein a washwater is sprayed over the gravel from a source 30 by way of a spray nozzle arrangement 32. The washwater and material stripped from the gravel is collected in the tank 28 and may be used in conjunction with handling the materials which are subject to the disposal method of the present invention.

As per conventional practice in recirculating drilling fluids in a conventional drilling operation, the fluid which has been freed of the separated gravel 24 and other solids is conducted via path 34 to a settling pit 36 wherein additional finer earth materials are allowed to settle and whereby the drilling fluid free of the heavier clays and sands may then be conducted to a suction pit 38 for recirculation by way of pump means 40 back to the drillstem 14. Certain additional solids separation apparatus previously mentioned, such as desilters or desanders, are not shown but may be interposed in the drilling fluid circulation path between the settling pit 36 and the suction pit 38 or between the suction pit 38 and the pump 40 whereby the drilling fluid is further conditioned for circulation back down the drillstem 14.

The collection of clays and silts in the settling pit 36 and from the aforementioned desander apparatus may be controlled by removing these materials in a slurry-like form through a conduit 42 to a pump 44 comprising a centrifugal-type pump which, in addition to forming a transport mechanism, tends to redisperse the materials settled out in the settling pit 36 into particles of a size that will provide relatively easy pumping of the material to its ultimate disposal site. In this regard the washwater from the gravel washing means 26, which also contains fine clays and other materials entrained therein, may also be mixed with the material flowing through the conduit 42 as indicated by the connection of a conduit 48 with the conduit 42 upstream of the pump 44. Alternatively, of course, all of the drilling fluid collected in the pit 36 may be conveyed to the injection well 50 at the conclusion of its use as a drilling fluid.

In accordance with one preferred mode of carrying out the present invention, the fluid which is transported and mixed by the pump 44 may be conveyed to an injection well generally designated by the numeral 50. The injection well 50 extends into a formation 51 and may be configured to have a tubing string 52 disposed therein and a packer 54 interposed in such a way as to provide a wellbore portion 56 which is isolated from a further wellbore annulus portion 58. The waste fluid conducted from the pump 44 may be conducted directly to a high-pressure injection pump 60 and then selectively injected into the well through the annulus 58 by way of a conduit 62 or through the tubing string 64. The fluid may be dispersed by fracturing the formation 51 and this action may be beneficial to further uses of the formation region which is fractured.

Depending on the composition of the waste drilling fluid, which may include substantial quantities of clay, fine sand and other materials added to the fluid or produced as part of the drilling cuttings, the fluid may be conducted to further mechanical agitating or mixing means generally designated by the numeral 66. The composition of the fluid in the agitating or mixing means 66 may be modified by the addition of water from the source 30 by way of a conduit 68 and the addition of certain conditioning substances such as dispersants or surfactants from a source 70, for example. Low molecular weight polyacrylates and alkyl-aryl-sulfonates are indicated as suitable dispersant materials.

Fluid discharged from the mixing means 66 is typically conveyed by way of a second centrifugal pump 72 to the inlet of the high-pressure pump 60. In some injection processes, the discharge pressure of the centrifugal pumps 72 or 44 may be sufficient to provide the requisite injection pressure into the disposal well 50. It is contemplated that with selective use of surfactant or dispersant substances, the waste drilling fluid, which includes quantities of solids generated during the drilling process, may contain as high as sixty five percent solids by weight. The permeability of the earth formation into which the waste fluid is injected may also dictate the maximum concentration of solids in the waste fluid.

In carrying out a preferred method in accordance with the present invention, conventional well drilling fluid is circulated through the wellbore 12 during a drilling operation and is conducted away from the wellbore by way of the conduit 18 to a separation apparatus such as the device 20 wherein solids, primarily gravel, of a selected size are separated from the drilling fluid and finer solids for reclamation for use as a construction material. The gravel 24 reclaimed in the screening device 20 may require further treatment such as the washing operation performed by the washing system 26 and further separation or classification processes may be carried out before the gravel is placed in use as a construction material. This gravel reclamation process may be carried out on a continuous basis while the drilling operation is being conducted or the screening and washing process may be carried out using drilling fluid which has been temporarily stored in a reserve pit or tank.

In the schematic diagram of the drawing FIGURE, the drilling fluid which passes through the screening device 20 is conducted to the settling pit 36 for further separation of finer solids such as clays, silts and fine sand. This separation process may include mechanical separators or desanders as previously mentioned. In any case if separation of the gravel 24 is carried out during a drilling operation, the drilling fluid is reconditioned by flow into the suction pit 38 and returned to the wellbore by way of the high-pressure pump 40. Certain components of the drilling fluid may be added to bring it into conformity to the desired specification of the fluid prior to returning it to the wellbore. Fine solids collected in the settling pit or discharged from desilting or desanding equipment, not shown, are conducted in a slurry-like composition to the centrifugal pump 44 and then to the injection well 50 by way of the further mechanical agitating means 66, if necessary, and with certain conditioning steps for the waste drilling fluid laden with solids such as the addition of water and a surfactant or dispersant. Use of the waste water from the operation of the washing system 26 is advantageously employed to form part of the fluid mixture which is subjected to the injection process. The washing process may, of course, not be required depending on the composition of the drilling fluid and the drilling cuttings which are entrained therein prior to the separation or screening step.

Certain components of the system illustrated in the drawing FIGURE are exemplary such as the screening device 20, the washing system 26, the mechanical agitator means 66 and the specific drilling fluid circulation system. Those skilled in the art will recognize that specific types of equipment may be employed for performing the gravel screening or separation process, the washing operation, if required, and mechanical agitation or dispersal of solids in the waste drilling fluid. An example of the inventive method for minimizing drilling wastes and reclamation of certain materials generated in well drilling operations in accordance with the present invention is described hereinbelow.

EXAMPLE

A conventional well is drilled in the Prudhoe Bay unit of Alaska comprising a seventeen and one-half inch diameter surface hole which is drilled to 3500 feet depth and produces approximately 1040 standard 42 U.S. gallon barrels (bbls) of drill cuttings. An intermediate hole of twelve and one-quarter inch diameter is then drilled to 9500 feet total depth and generates about 911 bbls of cuttings. A lower portion of the hole is drilled at eight and one-half inches diameter to a total depth of 11,000 feet and generates only about 176 bbls of waste. Accordingly, considering only hole volume, about 2127 barrels of waste are generated in the following proportions, surface hole portion, 49%; intermediate hole portion, 43% and production or lower hole portion, 8%. During drilling the screening device 20 is set to reclaim gravel 24 having a particle size of 100 mesh or greater. The material not recovered as gravel 24 is prepared as a slurry having a density of approximately 11.2 pounds per gallon and a percentage of solids by volume of about twenty-one percent. This slurry has an apparent viscosity of 53.5 CPS at 76° F., a plastic viscosity of 42 CPS and a yield point of 23 pounds per 100 feet square. This slurry is pumped into the well 50 by way of pump 60 and the centrifugal pump 44 or 72.

Although a preferred embodiment of a method and system in accordance with the present invention is described herein, those skilled in the art will recognize that various substitutions and modifications may be made to the specific embodiment described without departing from the scope and spirit of the invention as recited in the appended claims.

What is claimed is:

1. A method for minimizing drilling wastes formed during the drilling of a wellbore into the earth including reclaiming selected solids of a first selected size and comprising gravel entrained in a drilling fluid and disposing of certain other solids entrained in said drilling fluid, said method comprising the steps of:
   conducting drilling fluid from said well being drilled including entrained solids forming drilling cuttings to screening means, screening solids of said first selected size and comprising gravel from said drilling fluid and reclaiming said gravel;
   separating said other solids forming a slurry containing said other solids, from said drilling fluid;
   forming a slurry containing said other solids,
   providing an injection well into an earth formation and defining a wellbore space; and
   conducting said slurry to said injection well and injecting said slurry into said wellbore space.

2. The method set forth in claim 1 including the step of:
   washing said gravel prior to subjecting said gravel to further use.

3. The method set forth in claim 2 including the step of:
   collecting fluid used in washing said gravel and conducting said fluid used in washing said gravel for mixing said said other solids in forming said slurry.

4. The method set forth in claim 1 including the step of:
   dispersing said other solids in said slurry by conducting said slurry through centrifugal pump means before injection of said slurry into said injection well.

5. The method set forth in claim 4 including the step of:
   adding a dispersant to said slurry before injection of said slurry into said injection well.

6. The method set forth in claim 5 including the step of:
   adding one of low molecular weight polyacrylate and alkyl-aryl-sulfonate as said dispersant to said slurry before injecting said slurry into said injection well.

7. The method set forth in claim 1 including the step of:
   mechanically agitating said slurry to disperse said other solids before injection of said slurry into said injection well.

8. The method set forth in claim 1 wherein:
   said other solids is separated from said drilling fluid by allowing said other solids to settle in a settling pit from said drilling fluid.

9. A method for minimizing drilling waste produced during the drilling of an oil or gas well with a drilling fluid composition comprising the steps of:
   circulating said drilling fluid from a wellbore being formed using said drilling fluid to means for separating solids in said drilling fluid from said drilling fluid;
   separating solids of a first selected aggregated size from said drilling fluid;
   separating solids of a second selected aggregate size from said drilling fluid;
   providing an injection well extending into an earth formation and defining a zone for injection of drilling wastes thereinto;
   forming a slurry comprising at least a portion of said drilling fluid and solids of said second selected size range and composition and which have been produced during drilling of said well;
   injecting said slurry into said injection well for disposing of said slurry; and
   hydraulically fracturing a region of a formation into which said injection well extends with said slurry.

10. A system for minimizing surface drilling wastes generated during the drilling of a well being drilled into an earth formation by injection of said wastes into an earth formation through an injection well and for reclaiming gravel generated as drill cuttings during said drilling, said system comprising:
   means for conducting drilling fluid away from said well being drilled;
   means for separating solids of a first selected size and comprising said gravel from said drilling fluid conducted away from said well being drilled;
   means for washing said gravel with a wash liquid to remove drilling fluid from said gravel;
   means for separating solids of another size range from said drilling fluid;
   means for conducting a slurry comprising said solids of another range and at least one of said wash liquid and a portion of said drilling fluid to said injection well; and
   means for dispersing solids in said slurry before injecting said slurry into said injection well.

11. The system set forth in claim 10 wherein:
    said means for dispersing includes a centrifugal pump.

12. The system set forth in claim 10 wherein:
    said means for dispersing includes a mechanical agitator for receiving said slurry and for agitating said slurry to disperse said solids.

* * * * *

UNITED STATES PATENT AND TRADEMARK OFFICE
CERTIFICATE OF CORRECTION

PATENT NO. : 4,942,929

DATED : July 24, 1990

INVENTOR(S) : Edward Malachosky and Donna M. Lantero

It is certified that error appears in the above-identified patent and that said Letters Patent is hereby corrected as shown below:

Column 5, lines 50-51, delete "forming a slurry containing said other solids,".

Column 5, line 64, delete "said" (first occurrence) and insert --- with ---.

Column 6, line 27, delete "aggregated" and insert --- aggregate ---.

Signed and Sealed this

Thirty-first Day of March, 1992

Attest:

HARRY F. MANBECK, JR.

Attesting Officer

Commissioner of Patents and Trademarks